C. D. MILLER.
CLAMP.
APPLICATION FILED JAN. 25, 1921.
1,419,288.
Patented June 13, 1922.
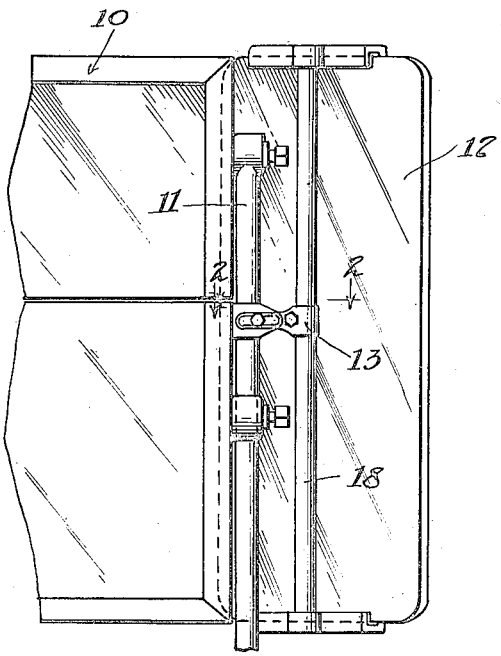
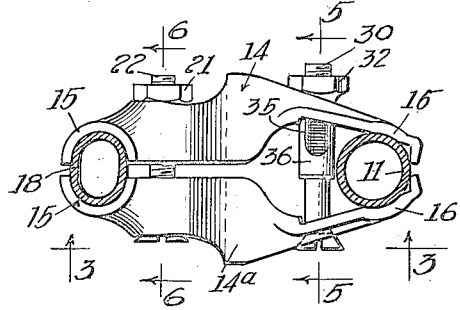
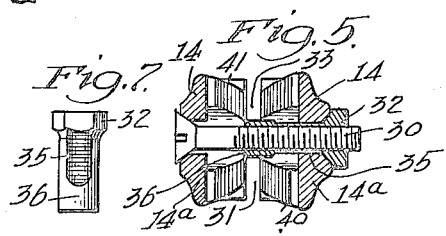
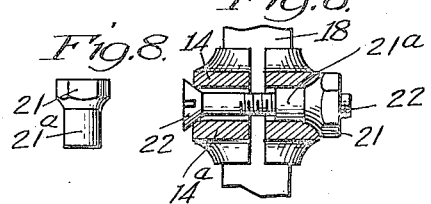
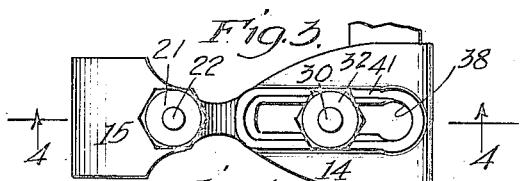
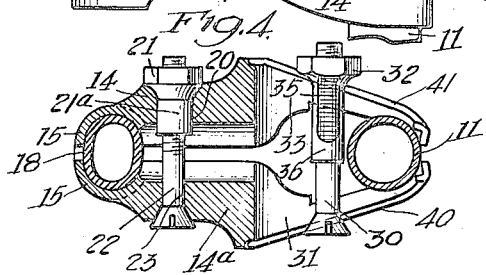
Inventor:
Chester D. Miller.
By
his Attorneys

UNITED STATES PATENT OFFICE.

CHESTER D. MILLER, OF LOS ANGELES, CALIFORNIA.

CLAMP.

1,419,288. Specification of Letters Patent. Patented June 13, 1922.

Application filed January 25, 1921. Serial No. 439,814.

*To all whom it may concern:*

Be it known that I, CHESTER D. MILLER, a citizen of the United States, residing at Los Angeles, in the county of Los Angeles, State of California, have invented certain new and useful Improvements in Clar ps, of which the following is a specification.

This invention has to do with a clamp particularly useful as a mounting device, or the like; and an object of the invention is to provide a clamp of this character which is simple, inexpensive and effective.

The clamp provided by the present invention is applicable to use in various arts, and in connection with various devices, apparatus, etc. It is herein set forth as employed in only one particular manner, but it will be readily understood that it is not in any way limited or restricted to such use or application. In fact, the present disclosure of the invention is merely for purpose of illustration and is merely typical of the manner in which it may be employed.

A particular and noteworthy feature of the invention is the simplicity and effectiveness of the device. These points make the device inexpensive to manufacture and of particular value commercially.

Other objects and features of the invention such as have to do with sightliness, strength, adjustability, etc., and other objects and features not herein specifically set forth or referred to, will be understood from the following detailed description of a preferred embodiment of the invention throughout which reference is had to the accompanying drawings, in which—

Fig. 1 shows the clamp provided by the present invention employed to mount a side wing on the standard of an automobile windshield; Fig. 2 is a view of the clamp taken as indicated by line 2—2 on Fig. 1; Fig. 3 is a side view of the clamp taken as indicated by line 3—3 on Fig. 2; Fig. 4 is a detailed sectional view taken as indicated by line 4—4 on Fig. 3; Fig. 5 is a detailed sectional view taken as indicated by line 5—5 on Fig. 2; Fig. 6 is a detailed sectional view taken as indicated by line 6—6 on Fig. 2; Fig. 7 is a view showing one of the clamping nuts removed from the rest of the clamp; and Fig. 8 is a view similar to Fig. 7 of the other clamping nut.

Throughout the drawings numeral 10 designates a typical automobile windshield having a standard 11 on which a side wing 12 is mounted by means of the clamp 13 provided by the present invention. The particular windshield 10 and side wing 12 shown in the drawings are typical devices of that character and the showing of the clamp 13 in connection with these particular devices is merely to show a typical application of it and to facilitate in setting forth its practical application.

The clamp 13 comprises, generally, two clamp members 14 and $14^a$, adapted to be arranged on and to grip the members to be clamped or held by the device, and means for holding and clamping the clamp members together. In practice it is preferred that the clamp members 14 and $14^a$ be castings and that they be formed at their ends with jaws 15 and 16. The jaws 16 are adapted to fit around and grip the windshield standard 11 when the clamp members 14 and $14^a$ are together, while the jaws 15 are adapted to fit around and clamp on the frame rod 18 of the side wing 12. Due to the fact that the invention is herein being illustrated in connection with a typical automobile windshield and a typical side wing, the clamp members 14 and $14^a$ generally, particularly the jaws 15 and 16 on the jaw members 14 and $14^a$, are designed and proportioned to accommodate or effectively fit the windshield standard 11 and frame rod 18. It will be understood, however, that the invention is not limited or restricted to the jaw members, and particularly the jaws 15 and 16, being formed or proportioned as disclosed in the drawings, as they may be varied considerably and made to fit or properly engage the particular members with which they are to cooperate.

The form of clamp which I have illustrated in the drawings is designed and constructed to be sold or supplied in connection with some particular device or manufacture and is adapted to be used to mount said device or manufacture or some other device or manufacture. In the particular case herein illustrated the clamp 13 is constructed to be supplied with the side wing 12 for mounting the side wings on the windshield standard of an automobile. Under these circumstances it is possible to make the clamp jaws 15, which engage the side wing frame rod 18, of a size to properly and accurately fit the frame rod 18, but it is not possible to make the clamp jaws 16 of a size or shape which will accurately fit any windshield standard 11 on which it may be desired to mount the side wing. For this reason the clamp jaws 16 are made of a size to best fit the average windshield standard 11 and are constructed so that they may be effectively arranged on windshield standards 11 of various sizes and shapes or cross sectional configuration.

Two bolts 22 and 30 are arranged in connection with the clamp members 14 and 14ª to hold and clamp them together. The bolt 22 extends through a bore 23 in the clamp member 14ª and has screw-threaded on it a clamping nut 21 which has a cylindrical portion 21ª that extends through a bore 20 in the clamp member 14. It will be noted in the drawings that the bores 23 and 20 are near, or close to, the clamp jaws 15 causing the bolt 22 and its cooperating clamping nut 21 to be at, or comparatively close to, the clamping jaws 15. It will be readily understood how tightening of the clamping nut 21 on the bolt 22 will cause the clamp jaws 15 to grip and be securely clamped on the frame rod 18. In practice any suitable means may be substituted for the bolt 22 to hold together or connect the end portions of the clamp members where the jaws 15 are formed.

The bolt 30 extends through a slot 31 in the clamp member 14ª and has screw threaded on it a clamping nut 32 which is carried in a slot 33 in the clamp member 14. The slots 31 and 33 are opposite each other, are arranged longitudinally of the clamp members and transversely of the jaws 16, and are arranged in the clamp members to extend to the clamp jaws 16, as clearly shown in the drawings. Flat parts 35 are formed on the cylindrical portion 36 of the clamping nut 32 to permit of the nut being carried in the slot 33 so that it can freely move in the slot but cannot be rotated. It will be noted in the drawings, particularly in Figs. 2 and 7 of the drawings, that the flat parts 35 do not extend the entire length of the cylindrical portion 36 thereby making it necessary to arrange the nut in, or remove the nut from, the slot 35 through the enlarged portion 38 at the outer end of the slot 33. With this construction the clamp 13 may be handled and adjusted without danger of the clamping nut 32 becoming displaced or lost from the slot 33. By constructing the clamp nut 32 so that the flattened portion, that is, the portion at the flat parts 35, accurately fits the slot 33, the nut 32 is prevented from turning when the bolt 30 is turned. This permits of the clamp jaws 16 being tightened, or set, by rotating the bolt 30 with a screw-driver, or the like.

From inspection of the drawings, particularly from Figs. 2 and 4 of the drawings, it will be noted that the jaw members are formed so that the outer edges 40 and 41 of the slots 31 and 33, respectively, are not parallel with each other, but converge toward the jaws 16, of the two members. With this construction tightening of the clamping nut 32 on bolt 30, by rotation of bolt 30, causes the bolt 30 and clamping nut 32 to move or wedge transversely toward the jaws 16 until the cylindrical portion 36, of the clamping nut 30, engages and bears tightly against the windshield standard 11, whereupon further tightening causes clamping or tightening of the jaws 16 on the windshield standard 11. In other words, this construction allows the bolt 30 and clamping nut 32 to automatically adjust themselves in the clamp members 14 and 14ª so as to be as close as possible to the windshield standard. The fact that the windshield standard is engaged by the clamping nut 32 as well as by the jaws 16 makes the device particularly effective and secure.

In practice the cooperation of the jaws 16 and clamping nut 32 makes the device applicable to being effectively arranged on various types or designs of supports. Further, the automatic adjusting, or positioning, of the bolt 30 and nut 32 to be at, or against, the member being held by the jaws 16, causes the bolt and nut to be particularly effective in holding the clamp members together, or in the clamped position.

It may be pointed out that the invention resides particularly in that end of the device provided with jaws 16 and that the other end of the device is immaterial and may be of any form or construction. In the particular case herein set forth the device is shown as formed of two clamp members and as formed with jaws 16. This is merely a construction which may be advantageously used when the device is employed as herein set forth. Further, it is to be understood that the device of this invention may be used in connection with any sort of machine or manufacture, and that it is in no way limited to the specific application herein set forth for purpose of illustration. For instance the device is not limited to use in connection with a sidewing for automobiles, or for use in connection with standards, brackets, etc., of any particular design and construction, or for any particular purpose.

Having set forth a preferred form of my invention I do not wish to limit or restrict myself to the specific details hereinabove set forth but wish to reserve to myself any changes or variations that may appear to those skilled in the art or that may fall within the scope of the following claims.

Having described a preferred form of my invention, I claim.

1. In a clamp, two members having jaw parts and one having an inclined part slotted transversely of the jaw parts, and a bolt for clamping the members together, the bolt being carried in the slot to be freely movable toward the jaws when tightened and having a part engaging said inclined part so that the bolt moves transversely toward the jaws when tightened.

2. In a clamp, two members having jaws adapted to grip an object, each jaw having an inclined part slotted transversely of the jaws, the slots extending to the jaws, and a bolt for clamping the members together, the bolt being carried in the slots so that it is freely movable longitudinally through them when it is tightened and having parts engaging the inclined parts so that the bolt moves transversely to bear against the object gripped by the jaws.

In witness that I claim the foregoing I have hereunto subscribed my name this 20 day of Jan., 1921.

CHESTER D. MILLER.

Witness:
E. D. CAVENDER.